US006993071B2

(12) United States Patent  
Birru

(10) Patent No.: US 6,993,071 B2
(45) Date of Patent: Jan. 31, 2006

(54) LOW-COST HIGH-SPEED MULTIPLIER/ACCUMULATOR UNIT FOR DECISION FEEDBACK EQUALIZERS

(75) Inventor: Dagnachew Birru, Yorktown Heights, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 871 days.

(21) Appl. No.: 09/812,437

(22) Filed: Mar. 20, 2001

(65) Prior Publication Data

US 2002/0163961 A1 Nov. 7, 2002

(51) Int. Cl.
H03K 5/159 (2006.01)
G06F 7/52 (2006.01)

(52) U.S. Cl. ..................... 375/233; 708/620
(58) Field of Classification Search ............. 375/233, 375/229, 232, 350; 364/760; 712/23; 708/322, 708/323, 300, 315, 620, 629, 632; 335/28 R
See application file for complete search history.

(56) References Cited

U.S. PATENT DOCUMENTS

| | | | | |
|---|---|---|---|---|
| 4,782,458 A | * | 11/1988 | Bhattacharya et al. | 708/319 |
| 4,924,492 A | * | 5/1990 | Gitlin et al. | 379/93.08 |
| 5,001,661 A | * | 3/1991 | Corleto et al. | 708/322 |
| 5,220,525 A | * | 6/1993 | Anderson et al. | 708/631 |
| 5,226,003 A | * | 7/1993 | Nagamatsu | 708/632 |
| 5,402,369 A | * | 3/1995 | Main | 708/625 |
| 5,957,999 A | * | 9/1999 | Davis | 708/606 |
| 5,958,000 A | * | 9/1999 | Jiang | 708/627 |
| 6,035,319 A | * | 3/2000 | Jong et al. | 708/628 |
| 6,226,323 B1 | * | 5/2001 | Tan et al. | 375/233 |
| 6,611,857 B1 | * | 8/2003 | Lemonds et al. | 708/629 |

OTHER PUBLICATIONS

Proakis, Ph.D., J.G., Digital Communications, Third Edition, Section 11-2 Adaptive Decision-Feedback Equalizer, pp. 649-650 (1995).

* cited by examiner

Primary Examiner—Betsy L. Deppe

(57) ABSTRACT

A multiplier device for multiplying one of a discrete set of digital level values with a filter coefficient in a filter device implemented in a decision feedback equalizer including (i) a decoder device for receiving a discrete digital level value to be multiplied and for generating control signals according to the digital level value, (ii) an inverter circuit providing two parallel operations, each operation including multiplying the determined number by either +1/−1 in accordance with the control signals for generating two intermediate results, (iii) a multiplier circuit receiving the two intermediate results and providing respective parallel operations for multiplying a corresponding intermediate result by +1 or zero (0) in accordance with a control signal and generating further intermediate results, (iv) a logic circuit for shifting bits of one further intermediate result to effect a multiplication of one of the further intermediate output result with a discrete digital level value different than any of the original plurality of discrete digital level values, and, (v) an accumulator device for adding the results of the logic circuit shift multiplication with the further intermediate output result to obtain a final multiplication result. The multiplier device is implemented for performing convolution operations with the filter and generating filter outputs implemented for reducing inter-symbol-interference in a communication system. The multiplier device advantageously achieves the desired multiplications for convolution operations using less semiconductor real estate, and at a greater speed and less redundancy.

17 Claims, 2 Drawing Sheets

LOW-COST HIGH-SPEED MULTIPLIER/ACCUMULATOR UNIT FOR DECISION FEEDBACK EQUALIZERS

BACKGROUND OF THE INVENTION

1. Field of the Invention

This invention relates generally to digital signal processing systems implementing decision feedback equalizers, and particularly, to a low-cost and high-speed multiplier accumulator cell design for decision feedback equalizer implementations.

2. Discussion of the Prior Art

Decision Feedback Equalization is a technique used to eliminate all inter-symbol interference (ISI) caused by the transmission channel in digital communication systems. FIG. 1 is a schematic illustration of a typical Decision Feedback Equalizer (DFE) system 10. As shown in FIG. 1, the typical DFE includes a feed forward path including a first finite impulse response (FIR) filter 12, a feedback path 13 including a second FIR filter 14, a decision device 15, and, an error calculator 18. The input symbol $x_n$ represents the symbol inputs which are input to the first finite impulse response (FIR) filter 12. It is understood that first and second FIR filters 12, 14 are linear transversal filters each representing an adaptive transfer function $f(n)$, $g(n)$, respectively according to respective sets of adaptable coefficients $f_n$, $g_n$. In operation, the output of the first FIR filter 12 is summed with the output of the feedback FIR filter 14 section to provide a desired DFE output represented as signal $v_n$ 20. The equalizer output $v_n$ may be described by the following equation 1):

$$1)\ v_n = \sum_{k=0}^{N_1-1} f_k x_{n-k} + \sum_{k=0}^{N_2-1} g_k y_{n-k}$$

Where N1 is the length of the forward filter f, N2 is the length of the feedback filter g, k is the index, and $y_n$ is the intermediate signal output of the decision device 15. In operation, the coefficients of each of the forward FIR filter 12 and feedback FIR filter 14 recursively adapt according to an output error signal $e_n$ 16 of the feedback path until some convergence factor or error metric, e.g., mean square error, is satisfied. As shown in FIG. 1, the output error signal $e_n$ 16 of the feedback path represents the difference between an input reference signal 21, i.e. a desired output signal, and the intermediate output signal $y_n$ 21 which is an output of decision block 15. As known to skilled artisans and described in the book "Digital Communications" by John G. Proakis, McGraw-Hill, 1995, 3rd ed., Ch. 11–2, pages 650 et seq., (ISBN 0-07-05-51726-6), the whole contents and disclosure of which is incorporated by reference as if fully set forth herein, the equalizer coefficients $g_n$ are adjusted recursively in the adaptive mode of the DFE.

FIG. 2 is a schematic diagram illustrating a typical implementation of a hardware unit 20 of the second (feedback path) FIR filter 14 for carrying out a second term summation in the convolution operation set forth in equation 1). In order to generate the coefficients, as shown in FIG. 2, the $g_n$ and $y_n$ input symbols are multiplied by a multiplier unit 25 and current the result is stored and added by adder unit 26 to the previous result value stored in accumulator register 29 to carry out the convolution operation.

The Decision Feedback Equalizers (DFE) implemented in North America Terrestrial Digital TV reception function according to the Advanced Television Systems Committee ATSC (8-VSB) DTV standard. According to this ATSC 8-VSB standard (as described at http://www.atsc.org/), eight amplitude levels are available for supporting up to 19.28 Mbps of data in a single 6 MHZ channel. Further, in accordance with the standard, the input $y_n$ of the feedback FIR filter is permitted to have discrete values only. For example, for the ATSC (8-VSB) DTV standard, the input $y_n$ of the feedback FIR filter can only have the values $\{-7, -5, -3, -1, 1, 3, 5, 7\}$. Referring back to FIG. 1, it is the decision device 15 that converts its input to one of these eight values by selecting one of those values that is closest to its input $v_n$. In practice, these eight values are represented as a 4-bit, two's complement number, $y_n$, so that they are suitable for a two's complement based arithmetic that is often used in digital computations. Assuming the feedback filter coefficients $g_n$ are N-bit, such two's complement representation require a 4-bit by N-bit multiplier device represented as multiplier accumulator device 25 (FIG. 2). Such multipliers are usually used in combination with an accumulator as shown in FIG. 2.

While the input data has only eight levels, the conventional implementation required the use of a 4×N-bit multiplier. This means that there is significant redundancy in the multiplier resulting in increased silicon cost. In addition, such a configuration is unnecessarily slow as the propagation time is dominated by the multiplier and the final adder.

It would thus be highly desirable to provide a multiplier/accumulator unit for a DFE that implements a feedback filter equalizer for performing convolution operations using reduced hardware, i.e., silicon area.

It would thus be highly desirable to provide a multiplier/accumulator unit for a DFE that performs convolution operations at great speeds without redundancy.

SUMMARY OF THE INVENTION

It is thus an object of the present invention to provide a multiplier/accumulator unit for a DFE that performs filter convolution operations using a reduced amount of hardware.

It is a further object of the present invention to provide a multiplier/accumulator unit for a DFE that performs a convolution operation at greater speeds without redundancy.

In accordance with the preferred embodiment of the invention, there is provided a multiplier device for multiplying one of a discrete set of digital level values with a determined number comprising: a decoder device for receiving a discrete digital level value to be multiplied and generating control signals according to the digital level value; an inverter circuit providing two parallel operations, each operation including multiplying the determined number by either +1/−1 in accordance with the control signals for generating two intermediate results; a multiplier circuit receiving the two intermediate results and providing respective parallel operations for multiplying a corresponding intermediate result by +1 or zero (0) in accordance with a control signal and generating further intermediate results; a logic circuit for shifting bits of one further intermediate result to effect a multiplication of one of the further intermediate output result with a discrete digital level value different than any of the original plurality of discrete digital level values; and, an accumulator device for adding the results of the logic circuit shift multiplication with the further intermediate output result to obtain a final multiplication result.

The multiplier device is implemented for performing convolution operations when determining the filter outputs of the DFE implemented for reducing inter-symbol-interference in a communication system, and advantageously achieves the desired multiplications using less semiconductor real estate, and at a greater speed and less redundancy.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

The invention is directed to a multiplier/accumulator device for facilitating the performance of convolution operations in sample-based filter operations in DFEs. An example convolution operation is described with respect to the second term of the summation in equation 1). This summation is often implemented by partitioning the summation into equal parts. For example, if the feedback part, e.g., the second term of equation 1, is partitioned into sub-units of length M, the second term of the summation in turn, may be described according to equation 2) as follows:

$$2) \sum_{k=0}^{N_2-1} g_k y_{n-k} = \sum_{i=0}^{N2/M-1} \sum_{k=0}^{M-1} g_{k+i*M} y_{n-k-i*M}$$

Figure 2:
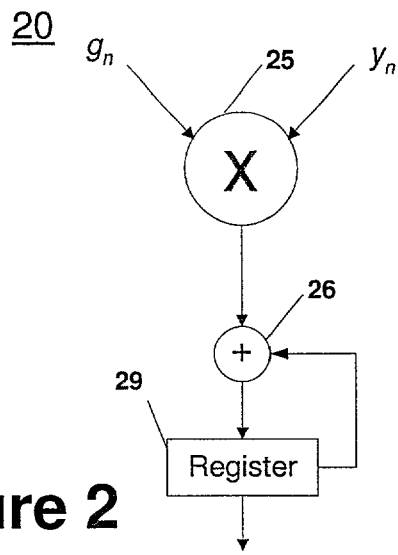
FIG. 2 is a block diagram depicting the hardware performing a filter convolution operation in the Decision Feedback Equalizer of FIG. 1.

Here, it is assumed that N2 is divisible by M. The inner summation is implemented using a multiplier/accumulator cell such as represented in FIG. 2 and the outer summation is often implemented using adder trees. The present invention provides a low-cost and high-speed implementation of the inner summation part.

Figure 3:
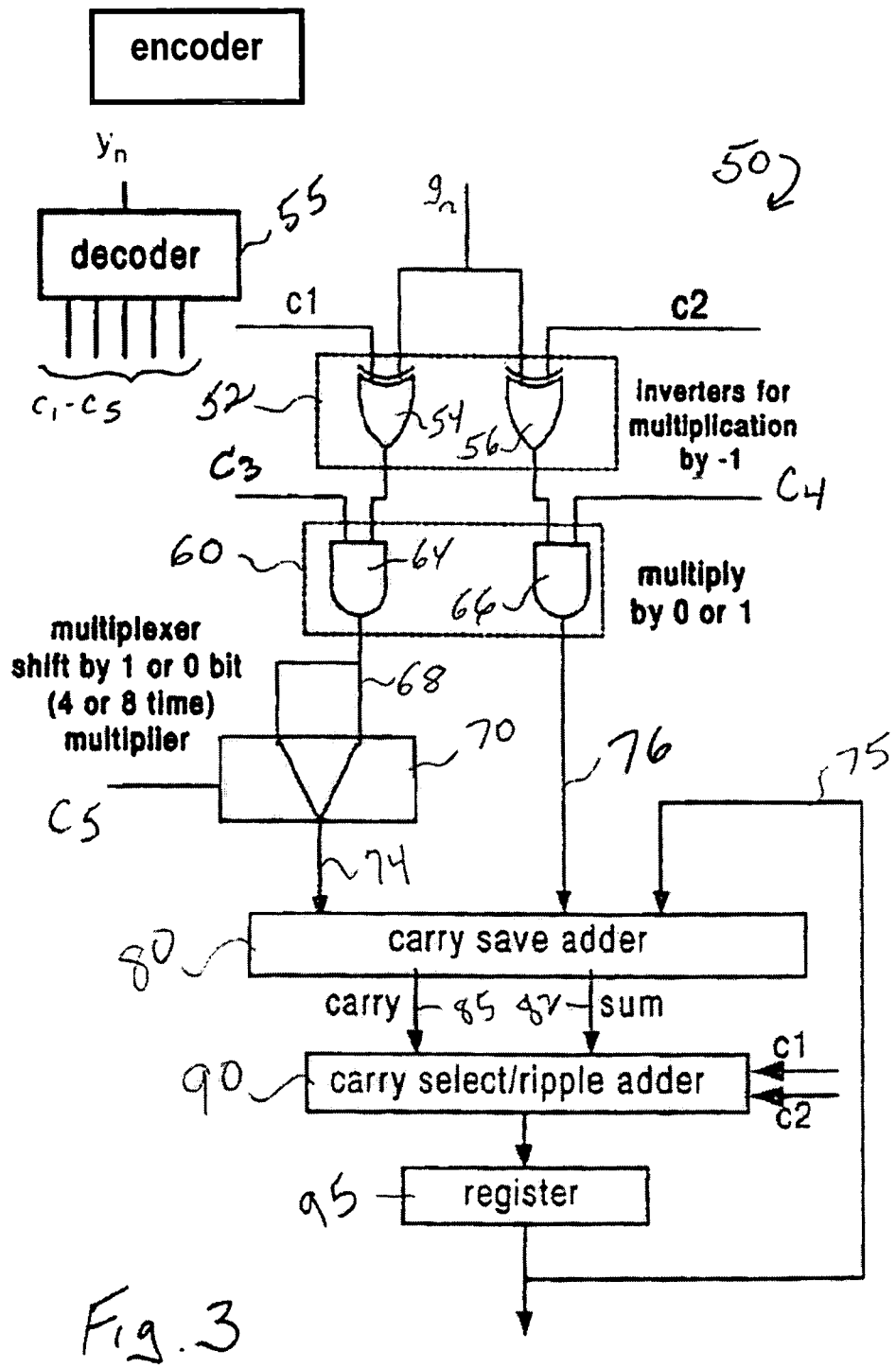
FIG. 3 is a block schematic diagram illustrating the improved multiplier hardware unit 50 according to the invention.

FIG. 3 illustrates the low-cost, high-speed multiplier circuit 50 according to the invention. The multiplier circuit 50 includes: an inverter circuit 52 represented as XOR gates 54, 56 each for receiving bits of the number "y" to be multiplied and effecting a bit inversion depending upon the value of respective input control signals c1, c2; a sub-multiplication circuit 60 comprising AND gates 64, 66 each for receiving a respective output bits of XOR gates 54, 56 which comprise either an inverted or non-inverted version of the number "g", and effecting a multiplication by either a 0 or a 1 depending upon the value of the respective input control signals c3, c4; and, a sub-multiplier circuit 70 which may be implemented as a two-input multiplexer or shift circuit for receiving the output 68 of AND gate 64 and effecting a 4× or 8× multiplication to the result 68 by shifting bits depending upon the value of control signal c5.

Figure 1:
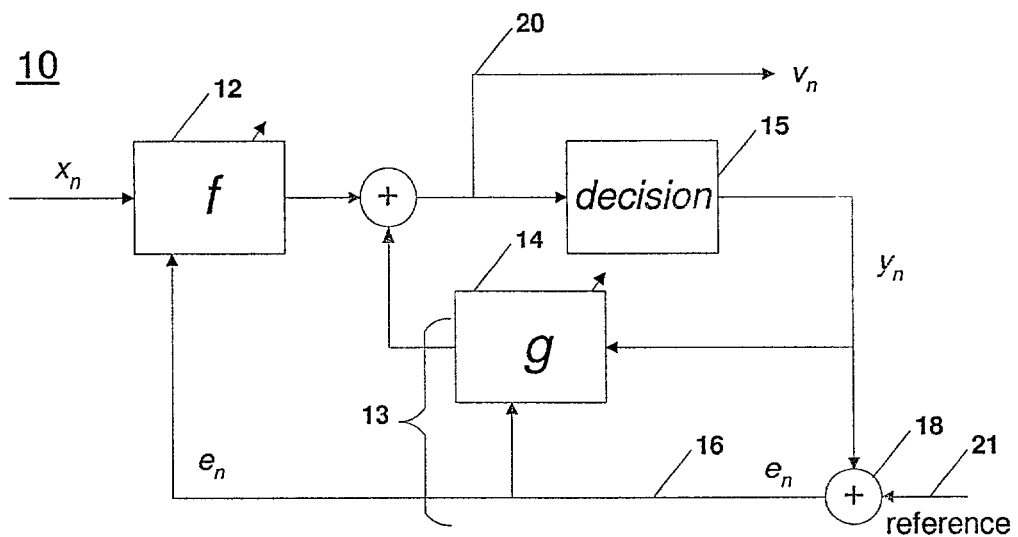
FIG. 1 is a block schematic diagram depicting a conventional Decision Feedback Equalizer.

According to the preferred embodiment of the invention, one of the eight level digital data coefficient values ($y_n$) −7, −5, −3, −1, 1, 3, 5, 7 (according to the ATSC (8-VSB) DTV standard) or a zero (0) level, is to be multiplied as part of a convolution operation with the filter coefficient, g. These $y_n$ values are first encoded as 3-bit data by the decision device 15 (FIG. 1). As shown in FIG. 3, the multiplier/accumulator circuit 50 is further provided with a decoder circuit 55 that includes logic for decoding these three bits and generating the appropriate output control signals c1–c5 for controlling the inverter circuit 52 and sub-multiplier circuits 60, 70 according to the particular input level digital data coefficient to be multiplied. For example, as mentioned above in view of FIG. 3, control signals c1 and c2 are of values for controlling an inversion (multiplication by −1), control signals c3 and c4 enable multiplication of an input by either one (1) or zero (0), and control signal c5 enables multiplication of the input value by either four (4) or eight (8) depending upon the input level digital data coefficient value.

In principal, as shown in FIG. 3, multiplication of a number, $g_n$, by any of the above input level digital data coefficient values $Y_n$ is accomplished by two sub-multiplication operations and an addition operation with the sub-multiplication accomplished by a simple bit shift and inversion. That is, according to the invention, the multiplier/accumulator circuit 50 is designed to carry out the sub-multiplication of a number $g_n$ by one of the following values: +/−8, +/−4, +/−1, and 0. For example, if $g_n$ is to be multiplied with a $y_n$ digital data coefficient value of −5, the multiplier/accumulator circuit 50 will carry out two sub-multiplication operations according to equation 3 as follows:

$$g_n*(-5)=g_n*(-4)+g_n*(-1).$$

Thus, as shown in FIG. 3, in this example multiplication, control signals c1–c5 will enable the multiplier/accumulator circuit 50 to carry out the multiply/accumulate operations as follows: a left hand side operation controlled by signals c1, c3 and c5 that enable multiplication of $g_n*(-4)$ and a right hand side operation controlled by signals c2, c4 that enable multiplication of $g_n*(-1)$. Thus, according to this example, for the left hand side operation $g_n*(-4)$, control signal c1 is of a value enabling conversion of $g_n$ to a negative value, control signal c3 is a value that enables multiplication by a one (1), and control signal c5 is a value that functions to select the input for the multiplexor thereby controlling multiplication by four (4). Likewise, according to this example, for the right hand side operation $g_n*(-1)$, control signal c1 is of a value enabling conversion of $g_n$ to a negative value, and control signal c3 is a value that enables multiplication by a one (1). The result of the left hand side operation $g_n*(-4)$ is a sub-multiplication result 74 while the result of the right hand side operation $g_n*(-1)$ is a sub-multiplication result 76. Skilled artisans will be able to further devise logic values for control signals c1–c5 to carry out any inverter and bit shifting operation to achieve the multiplication by any of the eight levels of the ATSC (8-VSB) DTV standard.

After the right side and left side sub-multiplications have been carried out, the resulting outputs 74, 76 are simply added by accumulator mechanism 80 which is a combined two-step carry-save adder structure for reducing the propagation time in the data path. Particularly, the two step adder structure 80 adds the sub-multiplication results 74, 76 and, the prior coefficient value 75 from the prior filter output which is stored in register 95. Accordingly, the carry save adder 80 provides a sum output 82 and carry output 85. These sum 82 and carry 85 output results are then input to a carry select/ripple adder circuit 90 which adds these results to provide a final filter output value for storage in register 95. As shown in FIG. 3, the control signals c1 and c2 are input to the carry select/ripple adder circuit 90 and added to the least significant position of the sum 82 and carry 85 outputs to correct the bits for any inversion operation that is performed in the multiplier. Addition of the sum 82 and carry 85 output results is then input back to register 95 and stored as the new filter output.

The multiplier/accumulator circuit of the invention is designed to operate at greater speeds than the conventional configuration. While the total propagating time here is largely dominated by the final adder propagation time, according to the invention, the propagation time of the multiplier is significantly reduced as it effectively comprises the equivalent of four logic gates. As typical feedback filters of DFEs include hundreds several such multiplier/accumulator cells, the advantage of the use of the multiplier/accumulator circuit 50 of FIG. 3, a substantial reduction in the overall silicon area will result, while at the same time increased operating speed.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. In a feedback equalizer device implementing a filter unit performing convolution operations between filter coefficients and one of a plurality of first discrete digital level values for generating a filter output, a multiplier device for multiplying a first discrete digital level value with a filter coefficient for said convolution operation, said multiplier device comprising:
   a decoder device for receiving and decoding an encoded, first discrete digital level value to be multiplied with a filter coefficient, and implementing logic for generating control signals according to said first digital level value;
   a first sub-multiplication circuit receiving said filter coefficient and implementing logic for multiplying said filter coefficient by a negative value in accordance with a first set of control signals and generating a first intermediate multiplication result therefrom;
   a second sub-multiplication circuit receiving said first intermediate multiplication result and implementing logic for multiplying said first intermediate result by a positive value or zero (0) in accordance with a second set of control signals and generating a second intermediate result therefrom;
   a third sub-multiplication circuit for shifting bits to effect a multiplication of one of said first or second intermediate result with a discrete digital value different than any of said first plurality of discrete digital level values, and generating a third intermediate result; and
   an accumulator device for adding the results of said third and the other of said first or second intermediate results to obtain a final multiplication result.

2. The multiplier device as claimed in claim 1, wherein said decision feedback equalizer is implemented in a communication system for processing signals in accordance with a ATSC (8-VSB) DTV standard, said plurality of first discrete digital level values including: +7/−7, +5/−5,+3/−3, and +1/−1 and represented as a three (3)-bit code signal.

3. The multiplier device as claimed in claim 2, wherein said third sub-multiplication circuit shifts bits for a multiplication of one of said first or second intermediate result with a discrete digital value of four (4) or eight (8) in accordance with a third set of control signals.

4. The multiplier device as claimed in claim 2, wherein said first and/or said second sub-multiplication circuit comprise an inverter circuit.

5. The multiplier device as claimed in claim 2, wherein said multiplier device includes one or more inverter circuits implemented as an XOR circuit.

6. The multiplier device as claimed in claim 2, wherein said accumulator device comprises a carry save adder device for generating sum and carry results.

7. The multiplier device as claimed in claim 6, wherein said accumulator device further comprises a ripple adder device for adding said sum and carry results.

8. The multiplier device as claimed in claim 7, wherein said ripple adder device receives one or more said control signals for bit correcting bits when a multiplication by −1 is performed according to a first or second control signal step.

9. The multiplier device as claimed in claim 6, further including a register for storing a filter result for use in said convolution operation, said accumulator device further adding a stored filter result with a final multiplication result of a current iteration.

10. The multiplier device as claimed in claim 2, further including a device for encoding a first discrete digital level bit value as a set of bits.

11. A method for performing multiplication in a decision feedback equalizer device including a filter unit for performing convolution operations between filter coefficients and one of a plurality of first discrete digital level values, said method comprising:
   a) decoding an encoded, first discrete digital level value to be multiplied by a filter coefficient, and implementing logic for generating control signals according to said first discrete digital level value;
   b) performing two parallel operations, each operation including multiplying said filter coefficient by either +1 or −1 in accordance with said control signals for generating two intermediate results, and, corresponding operations for multiplying a corresponding intermediate result by +1 or zero (0) in accordance with said control signals and generating respective first and second intermediate results in parallel;
   c) shifting bits to effect a multiplication of one of said first and second intermediate result with a second discrete digital value different than any of said plurality of first discrete digital level values, and generating a third intermediate result; and,
   d) adding the results of said third intermediate result and the other of said first or second intermediate results to obtain a final multiplication result.

12. The method as claimed in claim 11, wherein said decision feedback equalizer is implemented in a communication system for processing signals in accordance with a ATSC (8-VSB) DTV standard, said plurality of first discrete digital level values comprising: +7/−7, +5/−5, +3/−3, and +1/−1 and represented as a three (3)-bit code signal.

13. The method as claimed in claim 12, wherein said shifting step c) includes the step of shifting bits to effect a multiplication of one of said first or second intermediate result with a discrete digital value of four (4) or eight (8) in accordance with said control signals.

14. The method as claimed in claim 12, wherein said step of performing two parallel operations includes performing an inversion of said filter coefficient to be multiplied.

15. The method as claimed in claim 12, further including the step of storing a filter result in a register for use during a corresponding operation in said filter unit, said adding step d) including adding said stored filter result with a final multiplication result of a current iteration to obtain a new filter value.

16. A multiplier device for multiplying one of a set of discrete digital level values with a filter coefficient comprising:
  a decoder device for receiving and decoding an encoded, discrete digital level value to be multiplied and generating control signals according to said digital level value;
  an inverter circuit providing two parallel operations, each operation including multiplying a number by either +1/−1 in accordance with said control signals for generating two intermediate results;
  a multiplier circuit receiving said two intermediate results and providing respective parallel operations for multiplying a corresponding intermediate result of said inverter circuit by +1 or zero (0) in accordance with a control signals and generating respective further intermediate results;
  a logic circuit for shifting bits of one further intermediate result to effect a multiplication of one of said further intermediate results with one of one or more discrete digital level values different than any of said discrete digital level values; and
  an accumulator device for adding the results of said logic circuit shift multiplication with the other said further intermediate result to obtain a final multiplication result.

17. The multiplier device as claimed in claim 16, for use in a filter device for performing a convolution operation in an adaptive feedback equalizer implemented in a communication system for processing signals in accordance with a ATSC (8-VSB) DTV standard, wherein said discrete digital level values include: +7/−7, +5/−5, +3/−3, and +1/−1, and said different discrete digital level values include four (4) and eight (8) in accordance with said control signals.

* * * * *